(12) United States Patent
Blake et al.

(10) Patent No.: US 6,189,556 B1
(45) Date of Patent: Feb. 20, 2001

(54) LOW PROFILE, LOW RESISTANCE DISTRIBUTION VALVE AND METHOD FOR SWIMMING POOLS

(75) Inventors: Andy F. Blake, Phoenix; Paul A. Womack, Glendale, both of AZ (US)

(73) Assignee: Shasta Industries, Inc., Phoenix, AZ (US)

( * ) Notice: Under 35 U.S.C. 154(b), the term of this patent shall be extended for 0 days.

(21) Appl. No.: 09/189,176

(22) Filed: Nov. 10, 1998

(51) Int. Cl.[7] ..................................................... F16K 31/16
(52) U.S. Cl. ............................... 137/119.07; 137/624.14; 137/627
(58) Field of Search ......................... 137/624.14, 624.13, 137/627, 119.07; 251/89, 90, 93, 111

(56) References Cited

U.S. PATENT DOCUMENTS

| | | |
|---|---|---|
| 3,405,733 * | 10/1968 | Hansen .............................. 137/627 X |
| 4,313,455 * | 2/1982 | Pitman ........................ 137/624.14 X |
| 4,523,606 | 6/1985 | Gould et al. . |
| 4,570,663 | 2/1986 | Gould et al. . |
| 4,592,379 * | 6/1986 | Goetti .............................. 137/627 X |
| 4,817,656 | 4/1989 | Gould . |

\* cited by examiner

Primary Examiner—Kevin Lee
(74) Attorney, Agent, or Firm—Cahill, Sutton & Thomas P.L.C.

(57) ABSTRACT

A distribution valve for a swimming pool cleaning system includes a housing with a high pressure fluid inlet disposed on a side of the housing, a plurality of outlet ports for connection to a plurality of return lines, respectively, a plurality of valves opening or closing the outlet ports from the interior, and an impeller-driven gear assembly to sequentially open and close each valve in response to rotation of the impeller. A cover unit is connected to the housing, and includes an impeller chamber connected to an underside portion of the cover unit, with the impeller disposed concentrically in the impeller chamber. The impeller includes a circular disk base that forms a bottom of the impeller chamber. A guide passage extends from an inlet window of the impeller chamber to guide a stream of water from the inlet into the inlet chamber against blades of the impeller causing it to rotate. The impeller unloads spent water from the impeller chamber through an outlet window into the interior of the distribution valve.

12 Claims, 4 Drawing Sheets

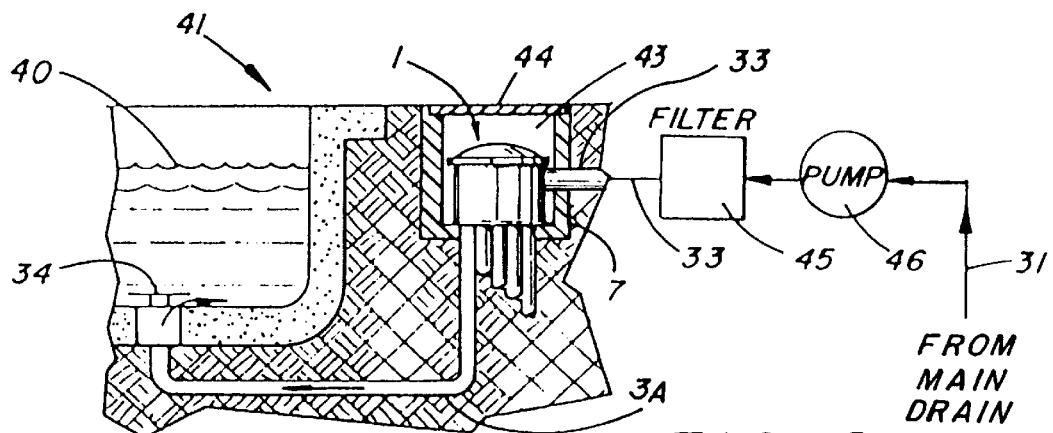
FIG. 2
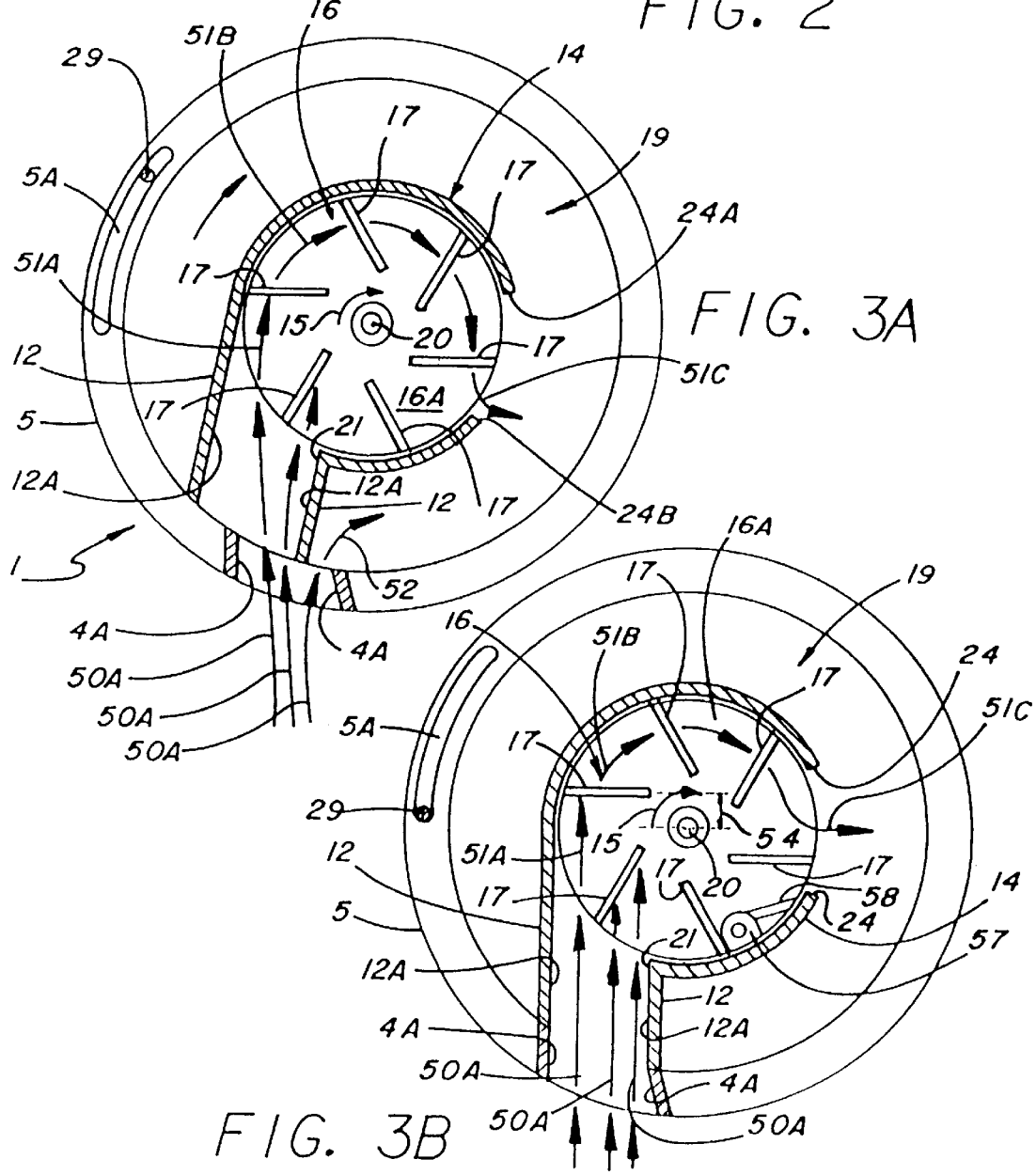
FIG. 3A
FIG. 3B

LOW PROFILE, LOW RESISTANCE DISTRIBUTION VALVE AND METHOD FOR SWIMMING POOLS

BACKGROUND OF THE INVENTION

The invention relates to distribution valves for successively directing return water received from the high pressure side of a swimming pool pump through multiple outlet ports and pipes to various groups of pop-up cleaning heads embedded in the pool floor and wall surfaces.

A number of multi-port distribution valves for sequentially distributing pressure from the high pressure port of a swimming pool pump to various groups of cleaning heads imbedded in the bottom and side walls of the pool are known. These include the distribution valve disclosed in commonly assigned U.S. Pat. No. 4,523,606 by Gould et al., issued Jun. 18, 1985, entitled "DISTRIBUTION VALVE" and U.S. Pat. No. 4,570,663 by Gould et al., issued Feb. 18, 1986, entitled "DISTRIBUTION VALVE WITH DUAL CAMS TO PREVENT UNCONTROLLED EXCURSIONS OF VALVE BALLS", both of which are incorporated herein by reference. Each of the distribution valves disclosed in the above referenced patents includes an impeller-driven gear reduction mechanism and a plurality of outlet valves controlled in response to the gear reduction mechanism. U.S. Pat. Nos. 4,523,606 and 4,570,663 disclose gear reduction mechanisms which include a stationary planetary gear disposed about a vertical axis of the distribution valve, a pair of symmetric gear assemblies each driven by a gear attached to the impeller, with each of the symmetric gear assemblies being supported on a rotary gear support base, and each also having an outer gear engaging the teeth of the planetary gear to cause the rotary gear assembly base to rotate in response to rotation of the impeller and thereby drive at least one foot-shaped cam which rotates through a 360° angle and sequentially displaces spherical balls from a valve seat of an outlet port. In each of the above prior distribution valves the pool return water from the high pressure side of the pool pump is fed into a vertical inlet pipe connected to the top of a dome-shaped cover section of the distribution valve.

The above mentioned distribution valves have been widely used, and the gear and impeller mechanisms have proven highly reliable. However, this inlet configuration adds considerable height to the entire distribution valve when installed. The resulting total height makes it impractical to install the distribution valve in a shallow deck box close to the edge of the swimming pool, so that the distribution valve and associated plumbing are out of sight. However, it would be highly desirable to be able to install a multi-port distribution valve in such a deck box. One reason is that it is desirable to have the distribution valve as close as possible to the pool so that lengths of PVC pipe as short as possible can be provided to couple the multiple outlet ports of the distribution valve to the various groups of cleaning heads embedded in the pool, in order to reduce the pressure drop to the cleaning heads. Such pressure drop reduces the force of the jets emitted by the pop-up cleaning heads in the pool surfaces, reducing their cleaning efficiency. The above mentioned deck box would have an easily removable cover to allow access to the distribution valve to facilitate servicing it. However, the height of the prior distribution valves, including roughly eight or more inches of inlet pipe (including a prior art pause valve) extending vertically upward from the top of the cover, and the need to keep the level of the distribution valve housing above the level of pool water, make it impossible to install the prior distribution valve in such a shallow deck box. This is because if the distribution valve with its eight or more inches of vertical connecting pipe on top were installed in a deck box, the distribution valve housing would be below the normal pool water level. Then, if the cover of the distribution valve were to be loosened to allow access to its interior for repair or service, the deck box would immediately be flooded with pool water, flooding the general area around the deck box, draining the pool down to the level of the top of the distribution valve housing, and generally making the service impossible or extremely difficult. Therefore, partial preliminary draining of roughly 4 to 6 inches of the pool water level (which, to say the least would be very inconvenient) would be necessary to bring its water level below that of the distribution valve.

Since it is not practical to install the above mentioned distribution valves in deck boxes at the edge of the pool decking, it often is considered necessary to locate the distribution valves a substantial distance from the pool, because the pool owner ordinarily wants the distribution valve and associated plumbing completely out of sight. In that case, each outlet port has to be coupled by a long PVC pipe to a group of cleaning heads. This results in increased plumbing costs. It also results in increased hydraulic resistance, and thus in a need to use higher horsepower pool pumps and larger amounts of electrical energy to operate the pool cleaning systems than would be the case if the distribution valve could be located in a deck box adjacent to the edge of the pool decking.

The assignee has provided an internal speed control valve in series with the above mentioned vertical inlet tubes to control the amount and direction of inlet water as it engages the impeller. This allows the user to adjust the amount of time each port is selected, and hence to adjust the total cycle time for cleaning the entire pool by removing the cover of the distribution valve and adjusting the desired speed. Adjustment of the impeller speed may be desirable when exceptionally large amounts of debris are blown into the swimming pool.

An external pause control feature has been provided on some of the above mentioned multi-port distribution valves, wherein a lever mechanism with an external control handle causes a vertical rod to move downward through a sealed sleeve bushing into the path of the impeller blade and thereby stop it from rotating. This causes a pause or halting of the cleaning cycle, which may be desirable when people are to be in the pool, for example, to prevent the people from stubbing toes on operating pop-up cleaning heads. However, the above mentioned external pause mechanism has been difficult to set, often requiring the effort of two persons, for example, a first person by a distribution valve located a considerable distance from the pool needs to actuate the pause control at the correct time, and a second person by the pool to observe the cleaning heads to determine when the desired pop-up heads are retracted and to signal the first person when to actuate the pause control.

One prior low profile distribution valve has been marketed by Sta-Rite, Inc. However, this device has not solved any of the above problems, for a variety of reasons. The Sta-Rite distribution valve feeds water from the high pressure port of the pool pump through a side wall of the cylindrical housing, directly into a structure forming a passage that leads to an inlet window of a cylindrical impeller chamber. The passage structure and the impeller chamber are attached to the lower surface of a cover clamped to the cylindrical housing, which contains an impeller and gear assembly that sequentially opens outlet ports of the housing. The cylindrical impeller chamber has a bottom which is solid, except for four radial slots extending outward from a central hole. When the cover is lowered onto the cylindrical housing, a four vane impeller is aligned with the radial slots and passes through them into the interior of the impeller chamber. Water pumped into the passage and flowing into the impeller chamber rotates the 4-vane impeller. Part of the water flows directly out through the 4 slots that admit the impeller vanes, and the rest is exhausted through an outlet window located in the cylindrical wall of the impeller chamber approximately 230° measured around the wall of the impeller chamber from the inlet window in the direction of impeller rotation. The Sta-Rite distribution valve was notoriously inefficient and unreliable. In fact, the assignee once installed 1500 of the Sta-Rite distribution valves (under agreement with Sta-Rite's predecessor), and within a period of one year had to replace all 1500 of them with a prior distribution valve. Although the Sta-Rite valve is still on sale, it ordinarily has to be installed in conjunction with an inlet pressure bypass valve that limits internal pressure to about 18 pounds per square inch. This sharply reduces the impeller speed, and reduces the amount of water ejected by the cleaning heads served by the distribution valve. Furthermore, such a large portion of the water pumped into the impeller chamber of the Sta-Rite distribution valve escapes through the four slots which admit vanes of the impeller that impeller speed is considerably reduced from what it otherwise would be; the duration of each outlet valve cycle is correspondingly increased.

Bottom feed distribution valve mechanisms also are known, but they have had the problem of requiring too many 90° elbows in the water lines and producing high hydraulic resistance. These devices are exceptionally difficult to service if removal is necessary.

Accordingly, there is an unmet need for an improved multi-port distribution valve which, while retaining the durability and reliability of the above mentioned multi-port distribution valves, can be conveniently installed in a shallow deck box adjacent to the pool decking around a conventional swimming pool, and which results in lower hydraulic resistance in the path from the outlet port of the swimming pool pump to the ejection nozzle of an actuated pop-up head. There also is an unmet need for such a device which can be easily serviced without flooding when installed in a shallow, out-of-sight deck box adjacent to a swimming pool, in which the distribution valve is installed. There also is an unmet need for an easily used impeller speed control system in a distribution valve.

SUMMARY OF THE INVENTION

Accordingly, it is an object of the invention to provide a low profile multi-port distribution valve which can be conveniently and efficiently installed in a shallow deck box adjacent to the decking of a swimming pool.

It is another object of the invention to provide an out-of-sight installation of low profile multi-port distribution valve for a swimming pool which allows reducing or minimizing the hydraulic resistance between the high pressure outlet port of the swimming pool pump and the ejection port of a pop-up pool cleaning head coupled to an outlet port of the distribution valve.

It is another object of the invention to provide a low profile, low hydraulic pressure, multi-port distribution valve having a highly reliable gear reduction mechanism.

It is another object of the invention to provide a low profile, multi-port distribution valve for a swimming pool cleaning system in which the cycle time is easily controllable, without affecting the amount of water being pumped through the presently open outlet port and hence through an ejection port of an actuated pop-up cleaning head.

It is another object of the invention to provide a multi-port distribution valve of the type described having a simple, easily useable, simple pause control to stop impeller operation without reducing the flow of water from the high pressure port of the swimming pool pump to the swimming pool through the presently opened outlet port of the distribution valve.

It is another object of the invention to provide an out-of-sight low profile multi-port distribution valve installation which reduces plumbing costs, reduces the required horsepower of the pool pump, and reduces electrical power consumption of the cleaning system.

Briefly described, and in accordance with one embodiment thereof, the invention provides a distribution valve including a housing with a high pressure fluid inlet disposed on a side of the housing, an interior volume, a plurality of outlet ports for connection to a plurality of return lines, respectively, a plurality of outlet valves opening or closing the outlet ports from the interior volume, respectively, and an impeller-driven gear assembly operative to sequentially open and close each valve, respectively, in response to rotation of the impeller. An cover unit is connected in sealed relationship to the housing to provide an upper boundary to the interior volume. The cover unit includes an impeller chamber connected to an underside portion of the cover unit, with the impeller disposed concentrically in the impeller chamber, including an impeller chamber inlet window and an impeller chamber outlet window. The impeller includes a circular disk base that slightly clears and forms a bottom of the impeller chamber. A guide passage extends from the impeller chamber inlet window to the high pressure fluid inlet to guide a stream of water from the inlet into the inlet chamber against blades of the impeller causing it to rotate, with the impeller guiding the water out of the impeller chamber outlet window into the volume. Water flowing into the high pressure inlet forces water through the impeller chamber, into the volume, through/around the gear assembly, through a presently open valve, and through a return line connected thereto. In the described embodiment, the high pressure inlet includes a nozzle of reduced cross sectional area to produce the stream of water as an increased velocity jet, and the guide passage shapes and guides the jet to flow without distortion through the impeller chamber inlet window. The impeller chamber is integral with the guide passage and the impeller chamber also is integral with a cover unit that engages the housing to form a sealed volume constituting the interior volume. The cover unit is rotatable relative to the housing to partially mis-align the guide passage with the stream of water so only part of the stream flows through the guide passage to rotate the impeller and the rest of the stream flows directly into the interior volume, reducing the impeller rotation speed. The cover unit is clamped to the housing by means of a clamp ring which when loosened allows rotation of the cover unit relative to the housing, one of the cover unit and housing having an arcuate slot, the other of the cover unit and housing having a stop which moves from one end of the arcuate slot to the other to establish precise alignment between an inlet end of the guide passage and the nozzle, the other end of the arcuate slot establishing a maximum permissible misalignment therebetween. The size and location of the impeller chamber outlet window are selected to present minimum hydraulic resistance to spent water guided from the nozzle by the guide passage to the impeller vanes.

BRIEF DESCRIPTION OF THE DRAWINGS

FIG. 2 is a section view illustrating installation of the distribution valve of FIG. 1 in a shallow deck box adjacent to pool decking surrounding a swimming pool.

FIGS. 3A and 3B are diagrams useful in explaining the hydraulic flow of water through the impeller chamber of the distribution valve of FIG. 1.

DETAILED DESCRIPTION OF THE PREFERRED EMBODIMENTS

Figure 1:
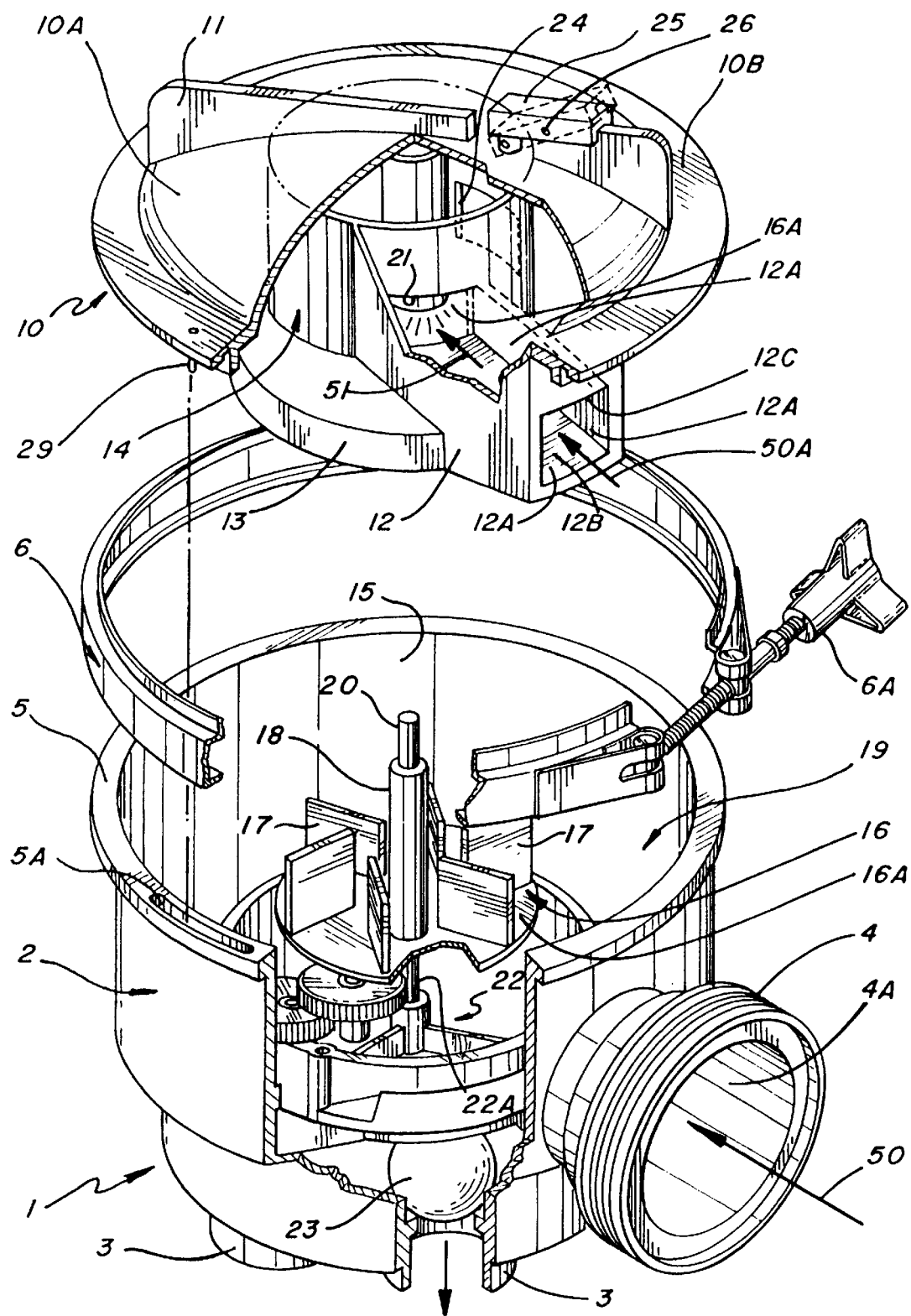
FIG. 1 is a exploded partial cutaway perspective view of the multi-port distribution valve of the present invention.

Referring to the drawings, particularly FIG. 1, low profile multi-port distribution valve 1 includes a housing 2 having a plurality (typically six) of outlet ports 3. Housing 2 has a high pressure inlet 4 having therein an interior frustoconical inlet nozzle 4A which receives high pressure water pumped via a horizontal 2 to 3 inch PVC pipe 33 from the outlet of a conventional filter 45, depending on the length of the pipe 33. Pipe 33 may be quite long, even 150 feet or more, especially in some commercial installations. Filter 45 receives pumped pool water from the high pressure outlet port of a conventional pool pump 46, as shown in FIG. 2. Pump 46 receives water from the main drain of the swimming pool via a pipe 31. Referring to FIG. 2, distribution valve 1 is installed in the interior 43 of a shallow deck box 7 located at the edge of and flush with the decking 28 of the swimming pool 41. Deck box 7 may be roughly a foot deep, to accommodate distribution valve 1 and its associated plumbing beneath a removable access cover 44.

Housing 2 includes a planetary gear assembly 22 therein which sequentially lifts each of a plurality of spherical balls 23 from valve seats on which they normally rest to form closed valves, to thereby open the valves and allow high pressure water forced into the interior volume 19 of distribution valve 1 by frustoconical nozzle 4A to flow out of the open valve and a corresponding outlet port 3. Referring to FIG. 2, a pipe 3A (typically 2 inch PVC pipe) extends from the outlet port 3 to at least one (usually three or four) conventional pop-up cleaning heads 34 embedded in the bottom surface or a side wall surface of swimming pool 41. The impeller 16 and planetary gear assembly 22 in FIG. 1 can be similar to that of the above commonly owned U.S. Pat. Nos. 4,523,606 and 4,570,663.

Housing 2 has a peripheral flange 5 that mates and forms a seal with a peripheral flange 10B of an cover unit 10. Cover unit 10 is clamped to housing 2 by means of a ring clamp 6. A suitable O-ring 35 (FIG. 4) in a groove in the bottom surface of flange 10B provides the seal with flange 54 of housing 2. A handle 6A is connected to an associated screw and nut block to tighten clamp ring 6 on peripheral flanges 5 and 10B, securely sealing them together.

In accordance with the present invention, cover unit 10 includes a generally cylindrical, bottomless impeller chamber 14, the upper edge of which is attached to a dome shaped cover portion 10A. When cover unit 10 is clamped to housing 2, impeller 16 is positioned inside of an impeller chamber 14, and is aligned with a vertical cylindrical axis thereof. Impeller 16 includes a horizontal impeller disk base 16A, which functions as an effective bottom of otherwise bottomless impeller chamber 14. Six vertical vanes 17 are rigidly attached to the upper surface of impeller disk base 16A. The diameter of impeller disk 16 is 3.6 inches. Each of impeller blades 17 has a height of 1.125 inches, a width of 1.0 inches, and a thickness of 0.1 inches. Vanes 17 are integral with impeller disk base 16A and also with a cylindrical impeller disk bearing 18, which rotates on a vertical cylindrical stainless steel rod 20 anchored to the supporting base of planetary gear assembly 22. Vertical rod 20 is coaxial with impeller chamber 14. The planetary gear assembly 22 and the general structure of impeller 16 are constructed generally as described in the above mentioned patents. However, the different illustrated placement of vanes 17 on disk base 16A is important. Each impeller vane 17 is placed so its outer vertical edge is aligned with the periphery of circular disk base 16A and the plane of each vane is located an offset distance 54 equal to 0.5 inches from the longitudinal axis of vertical rod 20, as shown in FIG. 3B.

Further in accordance with the present invention, impeller chamber 14 has a lower flange or gear plate retainer 13 FIG. 1 attached to its lower end. The periphery of gear plate retainer 13 is of the same diameter as the support base or gear plate of the gear assembly 22. The lower edge of gear plate retainer 13 is positioned slightly (about 0.03 inches) above the upper surface of the gear plate of gear assembly 22, acting as a retainer to prevent the gear assembly 22 from rising or "floating". The bottom of the cylindrical impeller chamber 14 is aligned with the flat top surface of impeller disk base 16A when cover unit 10 is clamped to housing 2.

Figure 4:
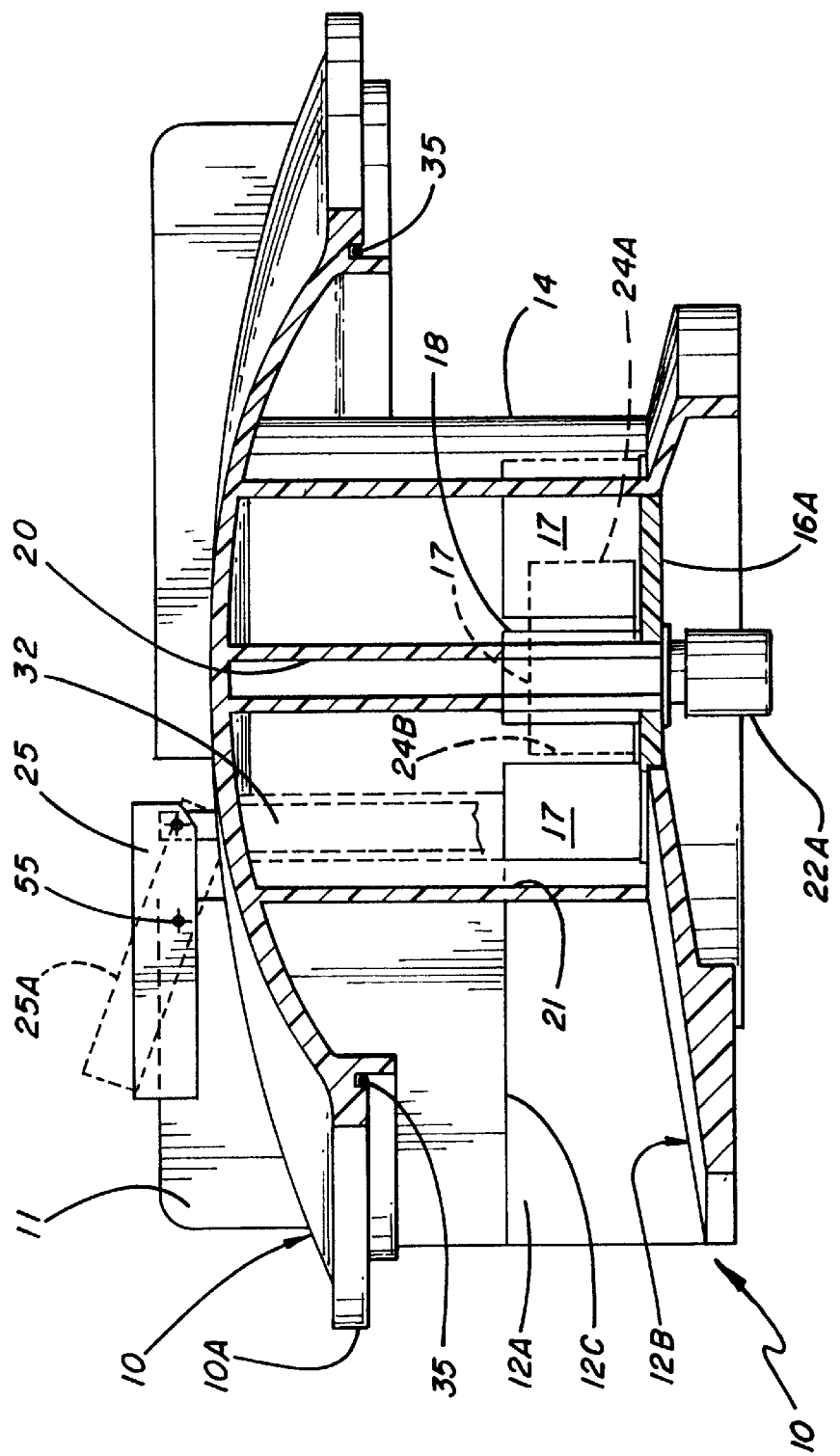
FIG. 4 is a partial side elevation view of the cover unit, including the cover and impeller chamber of FIG. 1.

A nozzle outlet guide passage 12 is attached to upper chamber 10, as shown in FIGS. 1 and 4. Nozzle outlet guide passage 12 provides a rectangular passage having vertical inner sides 12A, a sloped or ramped bottom surface 12B, and a horizontal upper surface 12C. Nozzle outlet guide passage 12 guides the high velocity, high pressure water jet formed by tapered frustoconical inlet nozzle 4A through an impeller chamber inlet window 21 into impeller chamber 14 so the jet impacts the impeller vanes 17 at an optimum angle, causing impeller 16 to rotate in the direction of arrows 15 in FIGS. 3A and 3B.

In accordance with the present invention, the inner end of ramped surface 12B of nozzle outlet guide passage 12 is precisely aligned with the upper surface of impeller disk base 16A.

Further in accordance with the present invention, impeller chamber 14 has an outlet window 24 precisely located as shown in FIGS. 3A and 3B to allow the vanes of the rotating impeller 16 to "unload" the "spent" water (i.e., water which has transferred most of its mechanical energy to impeller 16) into the interior volume 19 of distribution valve 1. Such water then flows through numerous gaps in planetary gear assembly 22 and through the particular outlet port 3 which has its corresponding spherical balls 23 raised by the above mentioned cam foot, to open the outlet valve formed by that ball 23. The exact size and location of outlet window 24 was selected experimentally to provide the desired impeller speed for a minimum pumped inlet flow rate of approximately 60 gallons per minute being pumped through pipe 33 of FIG. 2.

The clearance between the outer edge of impeller disk base 16A and the inner cylindrical wall of impeller chamber 14 is 0.0125 inches. The planetary gear assembly 22 is identical to that in the assignee's commercially available multi-port distribution valve Model Nos. 820 to 825, and is accurately described in the above referenced patents. The inside diameter of interior volume 19 is the same as that of the above mentioned distribution valve Model Nos. 820 to 825. The inlet diameter of frustoconical inlet nozzle 4A is 1.1910 inches, and the diameter of the outlet end which feeds the jet of water into nozzle outlet guide passage 12 is 1.3 inches. The height and width of the mouth of nozzle outlet guide passage 12 are 2.04 inches and 1.5 inches, respectively. The opposite edges of ramped surface 12B have lengths of 2.29 and 3.175 inches, respectively. Ramped surface 12B rises 0.59 inches from its outer edge to its inner edge.

The height and width of impeller chamber outlet window 24 are 0.95 inches and 1.725 inches, respectively. The "leading" edge 24A of the outlet window as shown in FIG. 3A is located 4.25 inches from the edge of impeller chamber inlet window 21 as shown in FIG. 3A. The "trailing edge" 24B of the outlet window as shown in FIG. 3A is located 2.525 inches from the edge of impeller chamber inlet window 21 as shown in FIG. 3A, the lengths referred to being measured along the arcuate cylindrical outer surface of impeller chamber 14.

In operation, the flow path of high pressure water ejected from frustoconical inlet nozzle 4A is shown by arrows 50A in FIGS. 1, 3A and 3B. In FIG. 3B, stop 29 extends from the bottom surface of peripheral flange 10B of cover unit 10 into arcuate slot 5A in peripheral flange 5 of housing 2, and limits the extent of counterclockwise rotation of cover unit 10 relative to housing 2 such that the vertical side walls of nozzle outlet guide passage 12 are precisely aligned with the inner end of frustoconical inlet nozzle 4A. (Of course, the locations of the stop and the arcuate slot could be reversed.) All of the water ejected from inlet nozzle 4A therefore flows as indicated by arrows 50A in FIG. 3B into impeller chamber window 21 and strikes the vanes of rotating impeller 16, causing impeller gear 22A to rotate clockwise and thereby causing planetary gear assembly 22 to sequentially open the valve balls 23 associated with the various outlet ports 3 of housing 2. The provision of disk base 16A of impeller 16 and the very small clearance between the peripheral edge of disk base 16A and the inner wall of impeller chamber 14 results in a very efficient bottom of impeller chamber 14 during operation, by maintaining high fluid pressure of the incoming jet from nozzle 4A and preventing leakage of pressurized water out of the bottom of impeller chamber 14.

In accordance with the present invention, it was found that the size and position of impeller chamber outlet window 24 is important to achieving the desired impeller speed and to achieving the most efficient operation of distribution valve 1. Arrows 51A and 51B in FIG. 3B are intended to indicate that the water ejected from inlet nozzle 4A loses momentum and mechanical energy as it imparts power to impeller 16. Outlet window is sized and located to optimally "unload" water from impeller chamber 14 into volume 19, as indicated by arrow 51C. Such unloaded water then is forced through the abundant gaps in gear assembly 22 and into the presently opened outlet valve and corresponding outlet port 3.

The inside dimensions and shape of the nozzle outlet guide passage are selected so that its smooth inner surface prevents water along the periphery of the high velocity stream ejected by nozzle 4A from causing disturbance in the flow of water into impeller chamber 14. It should be noted that the nozzle outlet passage 12 does not significantly redirect or reshape the main body of the high speed stream of water ejected by nozzle 4A, because that high velocity stream is aimed quite precisely so as to be centered in its path through impeller chamber inlet 21. This is unlike the guide passage of the above mentioned prior art Sta-Rite device, which redirects the stream of water pumped into the distribution valve housing as it enters the impeller chamber.

A great deal of experimentation was required to arrive at the above described combination of configurations of the impeller 16, the impeller chamber, the inlet passage, and the nozzle. The configurations and dimensions of both the impeller and the impeller chamber outlet window were especially critical. Initial efforts at optimizing the impeller speed with a 60 gallon per minute inlet flow from pipe 33 (FIG. 2) were focused on making adjustments to the size and location of impeller chamber outlet window 24. This approach failed to come close to meeting the needed impeller speed. Next, numerous impeller configurations with various numbers and sizes of impeller vanes were constructed and tested. Although some improvement was achieved, it failed to come close to meeting the required impeller speed which had been readily achievable with the prior impeller designs in the above referenced commonly owned patents. Finally, further experimentation with variations in the size and location of the impeller chamber outlet window 24, advancing the locations of the leading and trailing edges 24A and 24B one sixteenth of an inch at a time, suddenly led to a dramatic and unexpected improvement in impeller speed.

In accordance with the speed control aspect of the present invention, FIG. 3A shows that cover unit 10 has been rotated clockwise relative to housing 2 so that stop 29 is closer to the upper end of arcuate slot 5A than in FIG. 3B. Therefore, only a portion of the water 50A ejected from inlet nozzle 4A flows through impeller chamber inlet window 21 and impacts the vane 17 of impeller 16, resulting in a slower impeller rotation speed. The remaining portion of the ejected water flows as indicated by arrow 52 directly into the volume 19, where it is mixed with the "spent" water 51C ejected through impeller chamber outlet window 24 as shown in FIG. 3A.

Figure 5A:
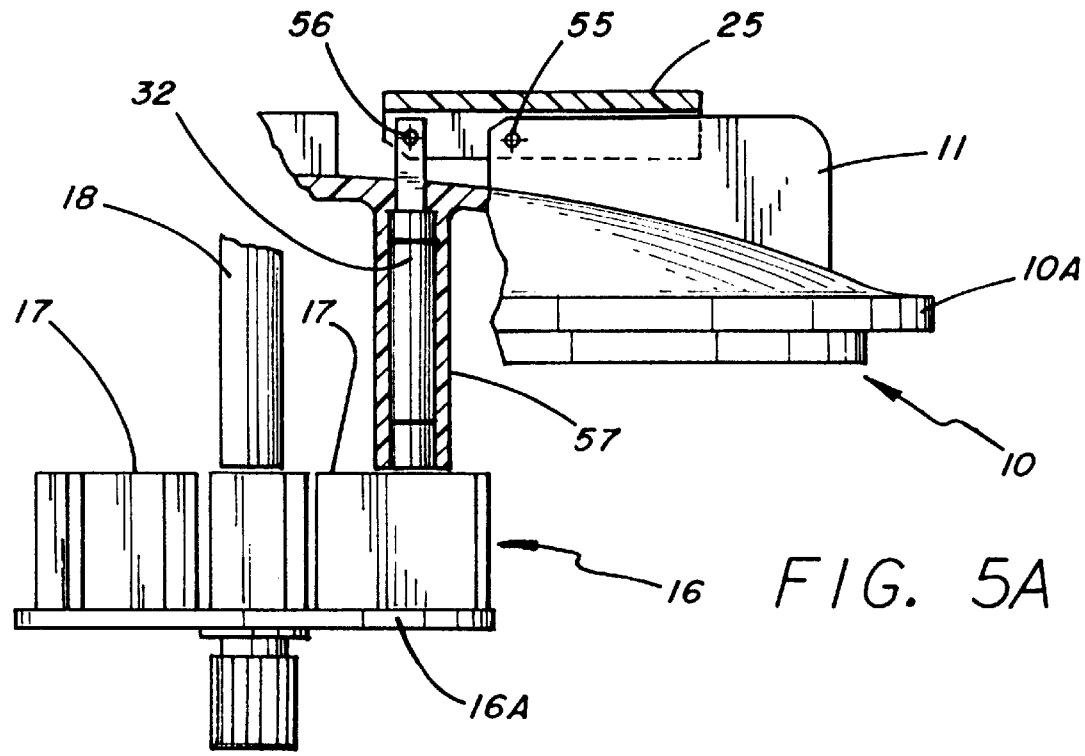
FIGS. 5A and 5B are partial section views useful in describing a pause mechanism of the distribution valve of FIG. 1.
Figure 5B:
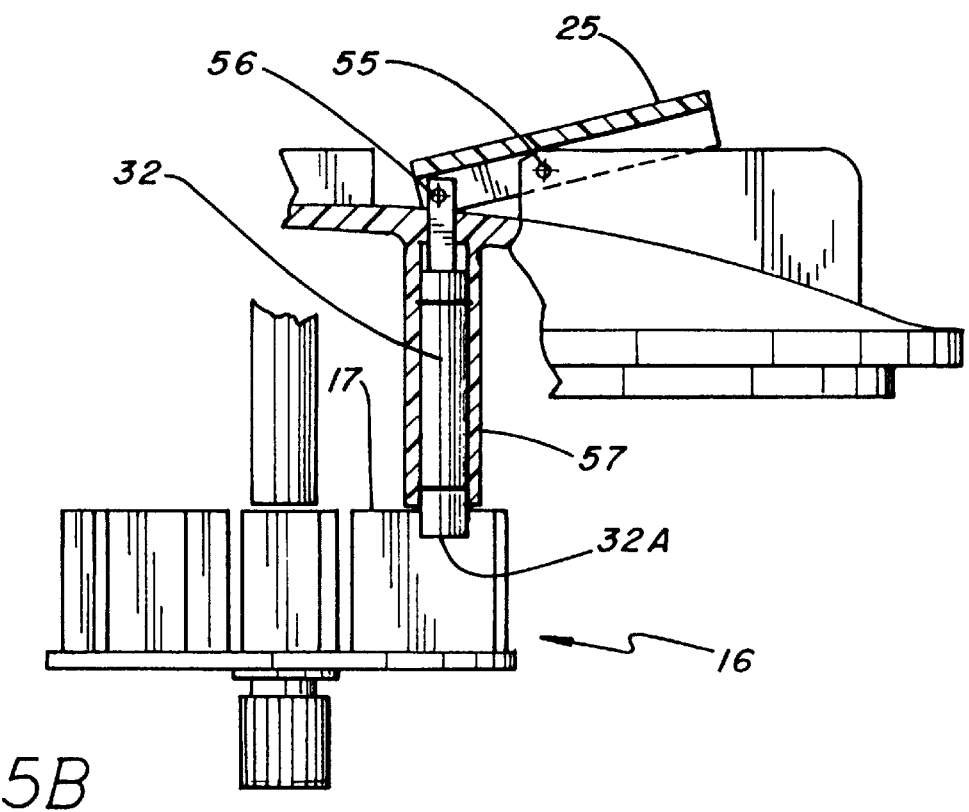

Referring to FIGS. 5A and 5B, the above mentioned pause control mechanism includes a handle 25 pivotally connected near its midpoint by pivot pin 25 to handle 11, which constitutes an elongated section of plate material attached to the upper surface of cover 10. The left end of handle 25 is connected by pivot pin 56 to a vertical plunger 32 that slides within a tube 57 so as to provide a seal that prevents pressurized water within the interior 19 of housing 2 from leaking out. As shown in FIG. 5A, with handle 25 horizontal, the lower end of plunger 32 clears the top of all of the impeller vanes 17. However, when one end of handle 25 is raised as shown in FIGS. 4 and 5B, the lower portion of plunger 32 is thrust downward as indicated by numeral 32A in FIG. 5B, halting rotation of impeller 16. However, all of the pumped water through nozzle 4A continues to flow through the presently open outlet port 3. Baffle plate 58 was found to be essential to providing a smooth, continuous flow pattern around the sleeve 57.

An advantage of the low profile distribution valve of the present invention is that it provides the reliability of the assignee's previous top feed distribution valves, and provides even more efficiency in the sense that impeller speed is increased for the same pumped inlet flow rate. The distribution valve can be installed in a subsurface deck box such that the upper edge of housing 2 is above the normal pool water level. Flooding of the deck box thereby is avoided when the cover unit 10 is loosened, either to remove it for servicing the distribution valve or to adjust the outlet valve cycle time by rotating the cover unit 10 relative to the stationary housing 2. The distribution valve of the present invention consequently avoids substantial additional plumbing expense that would be incurred (1) if a prior art distribution valve were to be located a long way from the edge of the pool to get it out of sight, or (2) in the form of landscaping or other measures to hide a prior art distribution valve mounted above ground near the swimming pool. The larger horsepower pump and higher energy consumption necessitated by having to locate the prior top feed distribution valves far from the pool are avoided by the installation of the above described low profile distribution valve in a subsurface poolside deck box. Another advantage of the described distribution valve is that the maximum distance between the edge of the swimming pool and the filter that is allowable without increasing the diameter of the pipe 33 (FIG. 2) is increased.

Another substantial advantage of the described low profile distribution valve is that not only can the impeller speed be made higher for a fast outlet valve cycle (defined as the amount of time required for a pop-up cleaning head which ejects a jet of water through its nozzle along the bottom surface of the pool to rotate through 360 degrees), the slowest outlet valve cycle time can be reduced from roughly 3 minutes for the assignee's prior top feed distribution valves to roughly 10 minutes for the present invention. This may be a substantial advantage to a pool owner, because even though short outlet valve cycle times often are adequate, at other times when a large amount of dust and debris has blown into the pool, it may be very advantageous to be able to lengthen the outlet valve cycle so that more debris will be stirred up by each pop-up cleaning head in the course of going through a 360 degree rotation.

Although the Sta-Rite distribution valve provided a low profile and the advantages of being able to locate it close to the edge of the pool and easily conceal it, it nevertheless was such an inefficient, unreliable device, and was such a notable commercial failure, that the above described low profile distribution valve of the present invention outperformed the Sta-Rite valve in every respect. Even though the low profile distribution valve of the present invention experiences internal pressure in the range from about 21 to over 26 psi, it avoids the need to provide an external 18 psi bypass valve as required by the Sta-Rite distribution valve. The fastest cycle time for the low profile distribution valve of the present invention is much shorter than that for the Sta-Rite distribution valve, and the amount of water ejected by the pop-up cleaning head and hence the effectiveness of the cleaning is much greater for the distribution valve of the present invention than for the Sta-Rite low profile distribution valve.

While the invention has been described with reference to several particular embodiments thereof, those skilled in the art will be able to make the various modifications to the described embodiments of the invention without departing from the true spirit and scope of the invention. It is intended that all elements or steps which are insubstantially different or perform substantially the same function in substantially the same way to achieve the same result as what is claimed are within the scope of the invention.

What is claimed is:

1. A distribution valve comprising:
   (a) a housing including a high pressure fluid inlet disposed on a side of the housing, an interior volume, a plurality of outlet ports for connection to a plurality of outlet pipes, respectively, a plurality of outlet valves opening or closing the outlet ports from fluid communication with the interior volume, respectively, an impeller, and an impeller-driven gear assembly operative to sequentially open and close each valve, respectively, in response to rotation of the impeller;
   (b) a cover unit having a sealed connection to the housing to provide an upper boundary to the interior volume, the cover unit including
      i. an open-bottomed impeller chamber having an upper end connected in sealed relation to an underside of the cover unit, with the impeller disposed concentrically in the impeller chamber, including an impeller chamber inlet and an impeller chamber outlet window,
      ii. the impeller having a circular disk base that clears the impeller chamber enough to allow rotation of the impeller and forms a bottom of the impeller chamber to prevent the flow of water from the interior of the impeller chamber through the open bottom of the impeller chamber during operation of the distribution valve,
      iii. a guide passage extending from the impeller chamber inlet to the high pressure fluid inlet to shield a stream of water from the high pressure fluid inlet into the impeller chamber against vanes of the impeller causing the impeller to rotate in response to water present in the interior volume, and to smoothly guide any diverging peripheral portion of the stream into the impeller chamber, the impeller guiding the water out of the impeller chamber outlet window into the volume; and
   (c) water flowing into the high pressure inlet forcing water through the impeller chamber, into the volume, through gaps in the gear assembly, through a presently open valve, and through an outlet pipe connected thereto.

2. The distribution valve of claim 1 wherein the high pressure fluid inlet includes a nozzle of reduced cross sectional area to produce the stream of water as a higher velocity jet of water.

3. The distribution valve of claim 2 wherein the guide passage shapes and guides the jet to flow without distortion through the impeller chamber inlet.

4. The distribution valve of claim 1 wherein the cover unit is rotatable relative to the housing to partially mis-align the guide passage with the stream of water so only part of the stream flows through the guide passage to rotate the impeller and the rest of the stream flows directly into the interior volume, reducing the impeller rotation speed.

5. The distribution valve of claim 2 wherein the nozzle is frustoconical.

6. The distribution valve of claim 4 wherein the cover unit is clamped to the housing by means of a clamp ring which when loosened allows rotation of the cover unit relative to the housing, one of the cover unit and housing having an arcuate slot, the other of the cover unit and housing having a stop which extends into the arcuate slot and moves from one end of the arcuate slot to the other to establish precise alignment between an inlet end of the guide passage and the nozzle, the other end of the arcuate slot establishing a maximum permissible misalignment therebetween.

7. The distribution valve of claim 1 wherein the cover unit includes no external fluid inlet.

8. The distribution valve of claim 1 wherein a plane of each of the impeller vanes is offset a predetermined amount from an axis of rotation of the impeller.

9. The distribution valve of claim 8 wherein the width of each of the impeller vanes is less than the radius of the impeller disk base.

10. The distribution valve of claim 1 wherein the size and location of the impeller chamber outlet window are selected to provide a maximum impeller rotation speed and to maximize a difference between a minimum impeller rotation speed and the maximum impeller rotation speed.

11. A distribution valve comprising:
(a) a housing including a high pressure fluid inlet disposed on a side of the housing, an interior volume, a plurality of outlet ports for connection to a plurality of outlet pipes, respectively, a plurality of outlet valves opening or closing the outlet ports from fluid communication with the interior volume, respectively, an impeller, and an impeller-driven gear assembly operative to sequentially open and close each valve, respectively, in response to rotation of the impeller;
(b) a cover unit having a sealed connection to the housing to provide an upper boundary to the interior volume, the cover including
  i. an open-bottomed impeller chamber having an upper end connected in sealed relation to an underside of the cover unit, with the impeller disposed concentrically in the impeller chamber, including an impeller chamber inlet and an impeller chamber outlet window,
  ii. the impeller having a circular disk base that clears the impeller chamber enough to allow rotation of the impeller and forms a bottom of the impeller chamber to prevent the flow of water from the interior of the impeller chamber through the bottom of the impeller chamber during operation of the distribution valve,
  iii. a guide passage extending from the impeller chamber inlet to the high pressure fluid inlet to shield a stream of water from the high pressure fluid inlet into the impeller chamber against vanes of the impeller causing the impeller to rotate in response to water present in the interior volume, and to smoothly guide any diverging peripheral portion of the stream into the impeller chamber, the impeller guiding the water out of the impeller chamber outlet window into the volume;
(c) water flowing into the high pressure inlet forcing water through the impeller chamber, into the volume, through gaps in and around the gear assembly, through a presently open valve, and through an outlet pipe connected thereto; and
(d) a pause control mechanism mounted on top of the cover unit and having a pivotal handle forming a lever which, when a free end thereof is raised, slides a rod through a sealed tubular guide to engage a vane of the impeller and prevent rotation thereof.

12. A distribution valve comprising:
(a) a housing including a high pressure fluid inlet disposed on a side of the housing, an interior volume, a plurality of outlet ports for connection to a plurality of outlet pipes, respectively, a plurality of outlet valves opening or closing the outlet ports from fluid communication with the interior volume, respectively, an impeller, and an impeller-driven gear assembly operative to sequentially open and close each valve, respectively, in response to rotation of the impeller;
(b) cover means for providing
  a sealed connection to the housing to provide an upper boundary to the interior volume,
  an open-bottomed impeller chamber having an upper end connected in sealed relation to an underside of the cover means, with the impeller disposed concentrically in the impeller chamber, including an impeller chamber inlet and an impeller chamber outlet window, and
  rotation of the cover means relative to the housing to partially mis-align the guide passage with the stream of water so only part of the stream flows through the guide passage to rotate the impeller and the rest of the stream flows directly into the interior volume, reducing the impeller rotation speed;
(c) means included in the impeller for forming, in effect, a bottom of the impeller chamber which prevents outflow of water from the open bottom of the impeller chamber during operation of the distribution valve;
(d) means for extending from the impeller chamber inlet to the high pressure fluid inlet to shield a stream of water from the inlet into the impeller chamber against vanes of the impeller causing it to rotate from water present in the interior volume, and to smoothly guide any diverging peripheral portion of the stream into the impeller chamber, the impeller guiding the water out of the impeller chamber outlet window into the volume;
  water flowing into the high pressure inlet forcing water through the impeller chamber, into the volume, through gaps in the gear assembly, through a presently open valve, and through an outlet pipe connected thereto.

\* \* \* \* \*